(12) United States Patent
Mancini et al.

(10) Patent No.: US 11,718,054 B2
(45) Date of Patent: Aug. 8, 2023

(54) APPARATUS FOR BUILDING TYRES FOR VEHICLE WHEELS

(71) Applicant: PIRELLI TYRE S.P.A., Milan (IT)

(72) Inventors: Gianni Mancini, Milan (IT); Gaetano Lo Presti, Milan (IT); Maurizio Marchini, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 145 days.

(21) Appl. No.: 17/085,943

(22) Filed: Oct. 30, 2020

(65) Prior Publication Data

US 2021/0046720 A1   Feb. 18, 2021

Related U.S. Application Data

(63) Continuation of application No. 14/907,096, filed as application No. PCT/IB2014/062737 on Jun. 30, 2014, now Pat. No. 10,857,749.

(30) Foreign Application Priority Data

Aug. 1, 2013   (IT) .......................... MI2013A001299

(51) Int. Cl.
   *B29D 30/24*       (2006.01)
   *B29D 30/30*       (2006.01)
   (Continued)

(52) U.S. Cl.
   CPC ....... *B29D 30/305* (2013.01); *B29D 30/0681* (2013.01); *B29D 30/20* (2013.01); *B29D 30/245* (2013.01); *B29D 30/246* (2013.01); *B29D 30/3014* (2013.01); *B29D 30/3042* (2013.01); *B29D 30/3057* (2013.01); *B60C 9/08* (2013.01); *B29D 2030/0682* (2013.01); *B29D 2030/086* (2013.01); *B29D 2030/3078* (2013.01); *B29D 2030/3085* (2013.01); *B29K 2105/256* (2013.01); *B60C 2009/0408* (2013.01)

(58) Field of Classification Search
   CPC ...... B29D 30/20; B29D 30/24; B29D 30/244; B29D 30/245; B29D 30/246; B29D 30/247; B29D 30/3021; B29D 30/3028; B29D 30/3042; B29D 30/305; B29D 30/3057; B29D 2030/3214
   See application file for complete search history.

(56) References Cited

U.S. PATENT DOCUMENTS

5,116,449 A * 5/1992 Fabris .................... B29D 30/32
                                                                    152/503
10,857,749 B2   12/2020 Mancini et al.
(Continued)

*Primary Examiner* — Geoffrey L Knable
(74) *Attorney, Agent, or Firm* — Steinfl + Bruno LLP

(57) ABSTRACT

An apparatus for building tyres for vehicle wheels are described. A substantially cylindrical carcass sleeve, having at least one carcass ply, includes consecutively adjacent strip-like elements laid one after the other around the circumferential extension of a substantially cylindrical deposition surface. Circumferentially consecutive strip-like elements laid one after the other form overlap zones along respective longitudinal edges superimposed on each other. Each overlap zone has, along a longitudinal extension thereof, terminal sections that are laterally opposite with respect to an intermediate section. The intermediate section of each overlap zone has greater width than the width of the terminal sections.

20 Claims, 6 Drawing Sheets

(51) Int. Cl.
  *B60C 9/08* (2006.01)
  *B29D 30/20* (2006.01)
  *B29D 30/06* (2006.01)
  *B60C 9/04* (2006.01)
  *B29D 30/08* (2006.01)
  *B29K 105/00* (2006.01)

(56) References Cited

U.S. PATENT DOCUMENTS

2011/0072664 A1* 3/2011 Marchini ............ B29D 30/245
  29/894.3
2014/0345784 A1* 11/2014 D'Oria .................. B29D 30/26
  156/115
2016/0144583 A1* 5/2016 Mancini ............ B29D 30/3057
  156/133

* cited by examiner

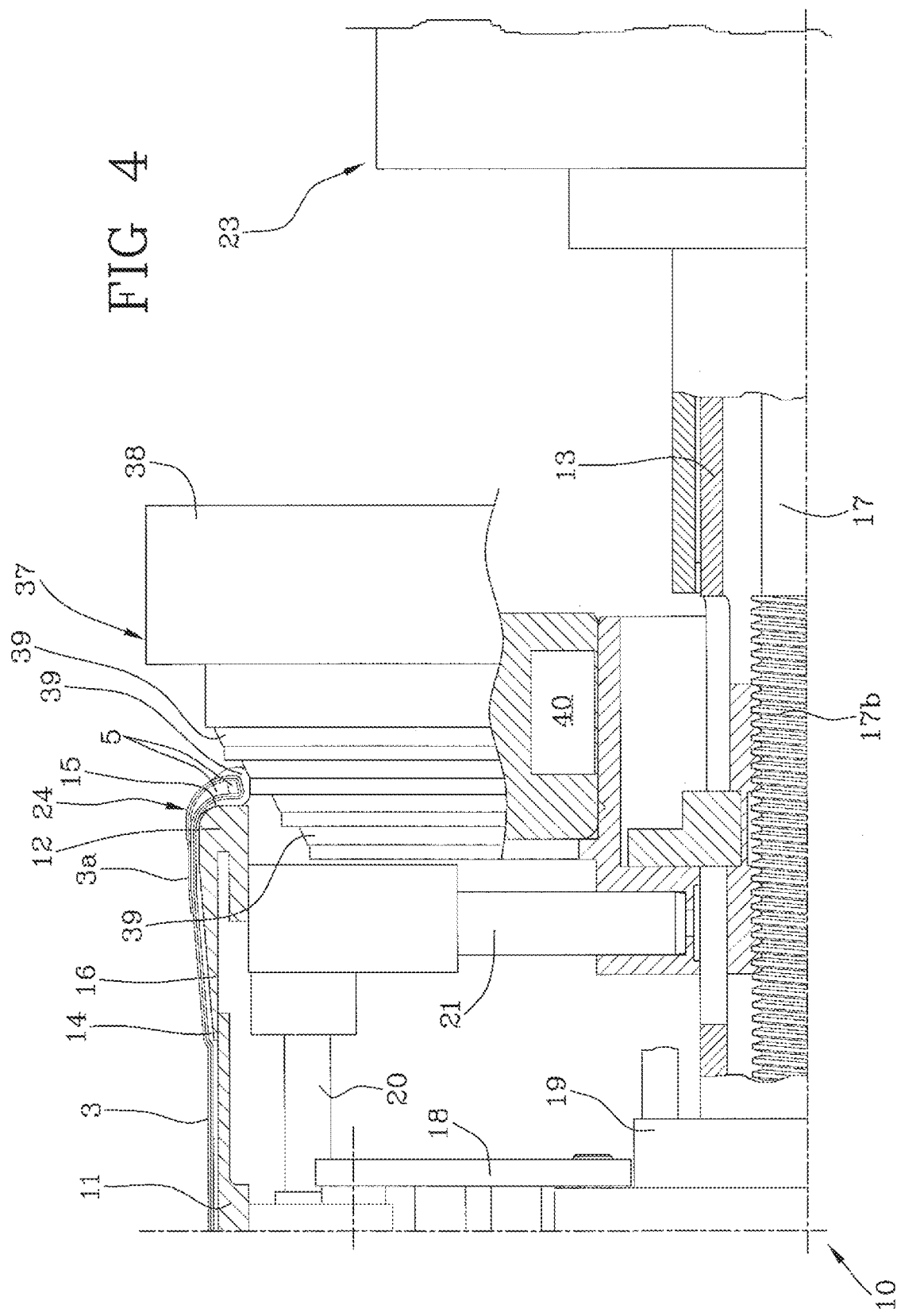

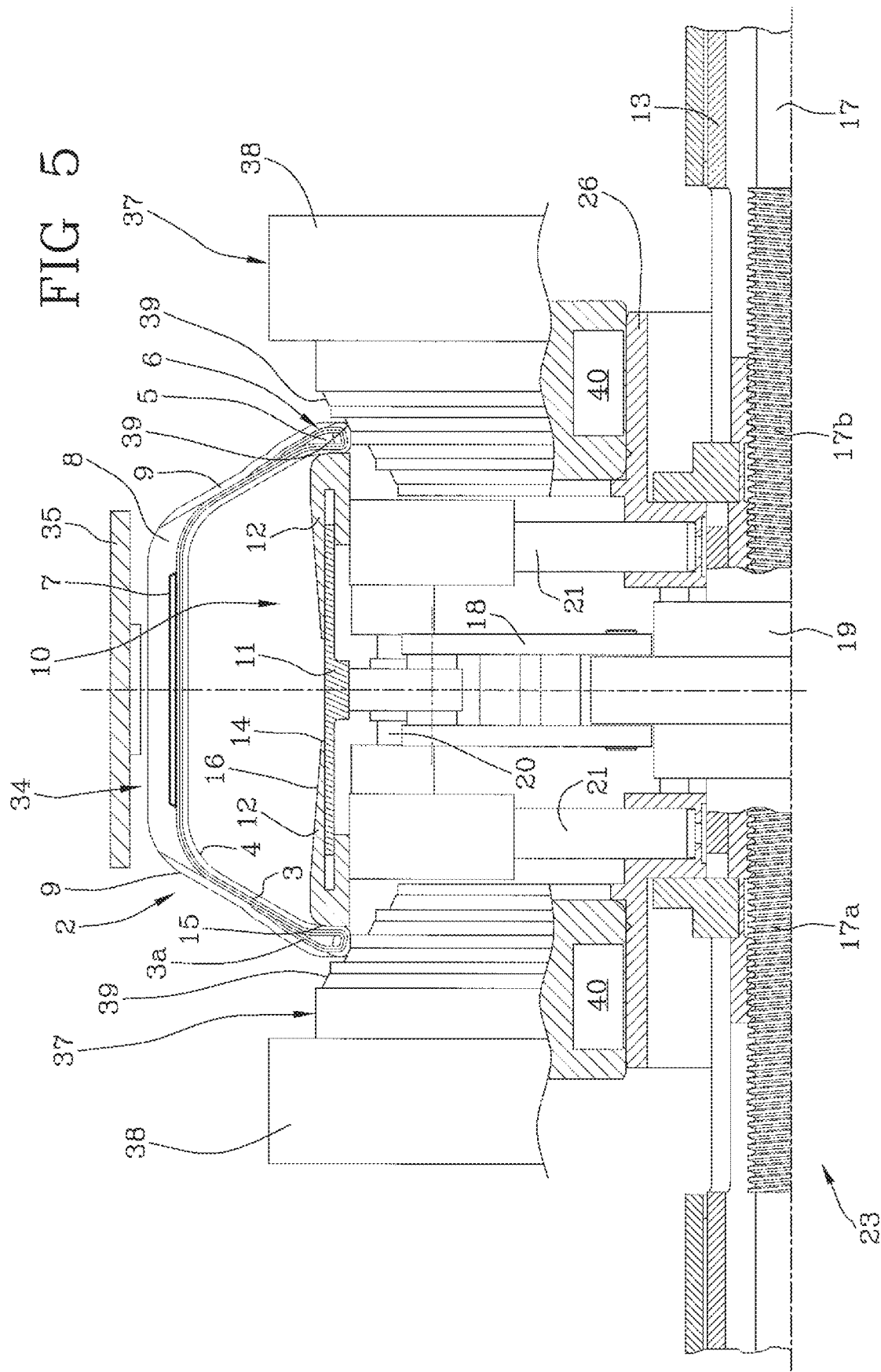

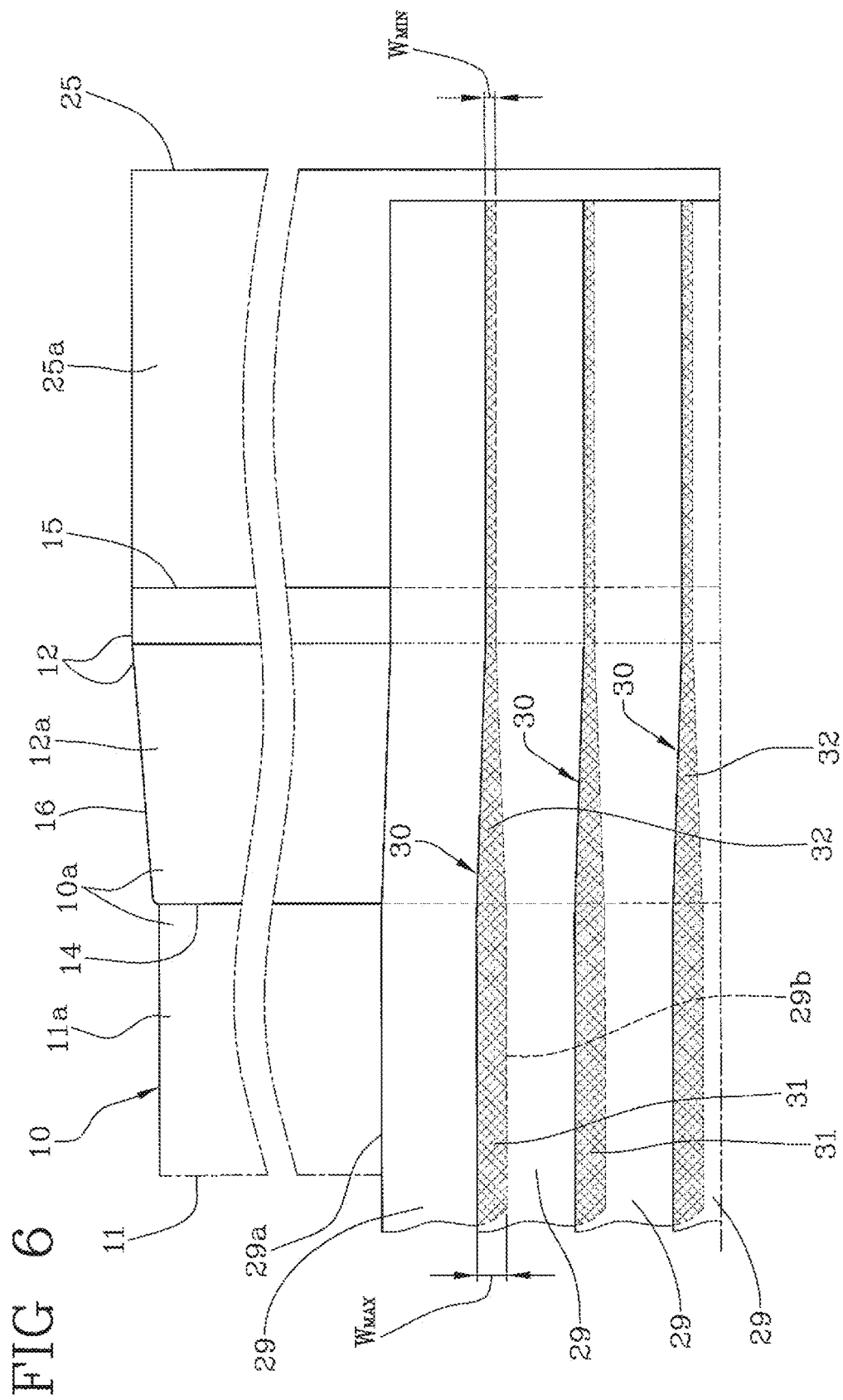

APPARATUS FOR BUILDING TYRES FOR VEHICLE WHEELS

CROSS REFERENCE TO RELATED APPLICATIONS

The present application is a continuation of U.S. application Ser. No. 14/907,096, filed on Jan. 22, 2016 which is the U.S. national stage entry of International Patent Application No. PCT/IB2014/062737, filed internationally on Jun. 30, 2014 which, in turn, claims priority to Italian Patent Application No. MI2013A001299, filed on Aug. 1, 2013. Each of these applications are incorporated by reference herein in their entirety.

BACKGROUND OF THE INVENTION

The present invention relates to a process and an apparatus for building tyres.

More particularly, the invention is intended for a process and the equipment used for building a green tyre, to be subsequently subjected to a moulding and vulcanising cycle, and intended for the tyre obtained by the aforesaid process.

A tyre for vehicle wheels generally comprises a carcass structure comprising at least one carcass ply having respectively opposite end flaps engaged with respective annular anchoring structures, integrated in the zones normally identified with the name of "beads", having an inner diameter substantially corresponding with a so-called "fitting diameter" of the tyre on a respective mounting rim.

The carcass structure is associated with a belt structure comprising one or more belt layers, situated in radial superimposition with respect to each other and with respect to the carcass ply, having textile or metallic reinforcement cords with crossed orientation and/or substantially parallel to the direction of circumferential extension of the tyre. In radially outer position with respect to the belt structure, a tread band is applied, it too made of elastomeric material like other semifinished products constituting the tyre.

Respective sidewalls made of elastomeric material area also applied in axially outer position on the lateral surfaces of the carcass structure, each extending from one of the lateral edges of the tread band up to the respective annular anchoring structure to the beads. In the tyres of "tubeless" type, a covering layer impermeable to air, usually termed "liner", covers the inner surfaces of the tyre.

Following the building of the green tyre actuated by assembling of respective components, a moulding and vulcanising treatment is generally executed that is aimed to determine the structural stabilization of the tyre by means of cross-linking of the elastomeric compositions as well as impart on the same a desired tread design and possible distinctive graphical signs at the sidewalls of the tyre.

The terms "radial" and "axial" and the expressions "radially inner/outer" and "axially inner/outer" are used, making reference to the radial direction and to the axial direction of a forming support (or building drum) used for building one or more components of the tyre. The terms "circumferential" and "circumferentially" are instead used, making reference to the annular extension of the aforesaid forming support.

The radial plane of the forming support is the plane comprising the rotation axis thereof.

Analogously, the radial plane of the finished tyre or tyre being processed is the plane comprising the rotation axis thereof.

With the term "elastomeric material" it is intended to indicate a composition comprising at least one elastomeric polymer and at least one reinforcement filler. Preferably, such composition also comprises additives such as a cross-linking agent and/or a plasticizing agent. Due to the presence of the cross-linking agent, by means of heating such material can be cross-linked, so as to form the final manufactured item.

With the term "elementary semifinished products" it is intended to indicate hereinbelow continuous elongated elements made of elastomeric material, textile and/or metallic rubberized cords, strip-like elements. By "strip-like element" it is intended a strip made of elastomeric material cut to size and comprising one or more textile or metallic reinforced cords, parallel, adjacent and substantially coplanar with respect to each other. Such elementary semifinished products are adapted to be used in a quantity suitable for composing one or more of the above-described constituent elements of the tyre, without requiring the storage of semifinished products.

By "continuous surface" relative to a building drum, it is intended a surface without interruption or in which possible openings (such as holes or grooves) are of size such that the elastomeric material of the semifinished product that substantially rests thereon does not penetrate it. The possible openings each have for example an area less than or equal to about 300 mm$^2$ (e.g. groove of about 150 mm of axial extension for about 2 mm of width) and the set of the openings overall have an area less than or equal to about 20%, preferably less than or equal to about 15% of the total area of said continuous surface.

By "overlap width", it is intended the size of the zone of mutual superimposition between two adjacent strip-like elements, measured along the circumferential extension of a deposition surface.

The document WO 2008/099236, on behalf of the same Applicant, illustrates a process and an apparatus for manufacturing tyres wherein a carcass sleeve is formed around an external surface of a building drum, according to an application diameter greater than the fitting diameter of the tyre. For such purpose, one or more dispensing members feed at least one continuous elongated element made of elastomeric material while the building drum is driven to rotate around its geometric axis, so as to form the liner on an external surface and on support surfaces of the building drum. Application members sequentially apply a plurality of strip-like elements arranged transverse with respect to the circumferential extension of the external surface, while the forming drum is driven to rotate according to a step-by-step progression, in order to form a carcass ply. Around each of the end flaps of the carcass ply, an annular anchoring structure defining the fitting diameter is coaxially engaged. An external sleeve comprising a belt structure associated with a tread band is arranged in coaxially centered position around the carcass sleeve built on the aforesaid building drum. The building drum comprises a central section and two half-parts that are axially movable with respect to the central section. By means of mutual axial approaching of the two half-parts, the same carcass sleeve is shaped according to a toroidal configuration in order to determine the application thereof against a radially inner surface of the external sleeve, according to a "process of building in a single step" or "single-stage process".

The document WO 2009/068939, on behalf of the same Applicant, illustrates a process and an apparatus for manufacturing tyres wherein a carcass ply is built by means of the application of a plurality of strip-like elements on a radially outer deposition surface of a building drum. An integer of strip-like elements to be applied is calculated as a function of the width of such strip-like elements, of the overlap width between two adjacent strip-like elements, of the extension of the deposition surface.

The Applicant has observed that, in order to prevent possible damage on the manufactured item being processed, it is opportune in the production systems of the above-described type that the internal surfaces of the carcass structure are separated from the deposition surface before the start of the mutual approaching of the half-parts of the building drum. This operation requires additional times in executing the process, since at least the carcass ply/plies impose considerable resistance to the dilatation that they must undergo in order to be separated from the deposition surface.

The Applicant has therefore perceived the need to attain considerable improvements in production processes, particularly in terms of reduction of the cycle-time required for executing the shaping and of increase of the qualitative constancy of the product.

In addition, in the scope of production processes of the illustrated type, the Applicant has perceived the possibility to improve the performances of the tyre in terms of fatigue strength and ride comfort.

More particularly, the Applicant deems that the performances in terms of fatigue strength and ride comfort of a tyre can be improved if the tyre is conferred greater structural flexibility. For such purpose, the Applicant has perceived that the structural flexibility of the tyre in the tyres built by means of the use of strip-like elements for obtaining the carcass ply/plies (for example as illustrated in WO 2008/099236 and WO 2009/068939) is significantly affected by the width of the overlap between the strip-like elements themselves in the built carcass ply/plies.

The Applicant has perceived that a limited width of the overlap between circumferentially contiguous strip-like elements can advantageously correspond with a greater structural flexibility of the carcass structure, particularly in the zones of the sidewalls extending from the axially opposite edges of the belt structure up to in proximity to the beads.

The Applicant has finally found that by reducing or cancelling the size of the overlap between circumferentially contiguous strip-like elements in proximity to the sidewalls and/or beads of the tyre, it is possible to attain significant quality improvements of the tyre itself and of the corresponding building process, particularly in terms of reliability, fatigue strength and ride comfort, as well as of reduction of the required cycle-time for executing shaping operations. According to the Applicant, it is still preferable to maintain an overlap of a sufficiently large size in proximity to the intermediate portions of the longitudinal extension of the strip-like elements, i.e. at the radially more outer zones of the toroidally-shaped carcass structure, in order to reduce the risk of undesired separations between circumferentially contiguous strip-like elements following the deformations induced during shaping.

SUMMARY OF THE INVENTION

According to a first aspect, the present invention relates to a process for building tyres for vehicle wheels.

Preferably it is provided to form a substantially cylindrical carcass sleeve, comprising at least one carcass ply.

Preferably said at least one carcass ply is formed by laying consecutively adjacent strip-like elements one after the other around the circumferential extension of a substantially cylindrical deposition surface.

Preferably circumferentially consecutive strip-like elements are laid one after the other to form overlap zones along respective longitudinal edges superimposed on each other.

Preferably each overlap zone has, along a longitudinal extension thereof, terminal sections that are laterally opposite with respect to an intermediate section.

Preferably the intermediate section of each overlap zone has greater width than the width of the terminal sections.

The Applicant deems that it is thus possible to attain an advantageous containment of the width of the overlap in the terminal portions of the carcass sleeve, without having to also reduce the size of the overlap in the central zones. The Applicant has indeed observed that the reduction of the width of the overlap in the terminal zones does not compromise the structural integrity of the carcass sleeve, even for the purposes of the shaping thereof according to a toroidal configuration. More particularly, the Applicant deems that the deformations and stresses induced by the shaping operation are particularly concentrated in the intermediate zone of the axial extension of the carcass sleeve, where a greater circumferential and radial dilatation is required for bringing the carcass ply in contact against the internal surface of the external annular sleeve. On the contrary, towards the terminal zones the deformations and consequent stresses are progressively reduced, up to in proximity to the beads of the tyre, which maintain a constant diameter even during shaping. The Applicant finally deems that the reduction of the width of the overlap in the terminal portions facilitates the operations of mounting the tyre on the rim, due to a greater deformability of the beads.

According to a further aspect, the present invention relates to an apparatus for building tyres for vehicle wheels.

Preferably first forming devices are provided for, configured for forming a carcass sleeve on a building drum.

Preferably said first forming devices comprise laying devices configured for laying circumferentially consecutive strip-like elements around the circumferential extension of a substantially cylindrical deposition surface presented by the building drum.

Preferably said building drum has a central section defining an intermediate portion of the deposition surface.

Preferably said building drum has two half-parts axially positionable with respect to the central section and defining axially outer terminal portions of the deposition surface.

Preferably said terminal portions have diameter greater than an application diameter presented by the intermediate portion.

Preferably said half-parts are slidably engaged around the central section. Preferably, said central section is axially fit in radially inner position with respect to said half-parts.

The Applicant deems that the substantially concave profile in cross section consequently conferred to the intermediate portion of the deposition surface facilitates the execution of the separation of the internal surfaces of the carcass sleeve from the deposition surface itself, for example due to air or another pressurised operating fluid introduced into the sleeve itself. The subsequent radial expansion for the purposes of the shaping can thus occur in a uniform and continuous manner, without the mutual approaching half-parts being able to mechanically interfere with the internal surfaces of the carcass sleeve. Due to the concavity of the profile, the carcass ply/plies, the liner and/or other structural components associated therewith can carry out a slight radial dilatation required for separation purposes, without having to oppose significant mechanical strength and/or be subjected to irregular stresses. A possible anticipation of the introduction of the operating fluid in the carcass sleeve with respect to the start of the mutual approaching of the half-parts, for the purpose of executing the shaping, can therefore be limited to values not greater than about 1-2 seconds, or it can even be avoided.

According to a further aspect, the present invention relates to a tyre for vehicle wheels.

Preferably, said tyre comprises a carcass structure comprising at least one carcass ply formed by strip-like elements consecutively adjacent one after the other according to a circumferential extension and having overlap zones along respective longitudinal edges superimposed on each other. Preferably, each overlap zone has, along a longitudinal extension thereof, terminal sections that are laterally opposite with respect to an intermediate section.

Preferably, the intermediate section of each overlap zone has greater width than the width of the terminal sections.

In at least one of the aforesaid aspects, the invention also comprises one or more of the preferred characteristics that are described hereinbelow.

During the deposition, circumferentially consecutive strip-like elements are laid one after the other, in such a manner ensuring that a first longitudinal edge of the subsequent strip-like element is superimposed on a corresponding second longitudinal edge of the previously laid strip-like element.

Preferably, the overlap zone has width progressively decreasing away from the intermediate section.

In this manner, a gradual variation of the rigidity of the carcass structure is obtained in moving away from the shoulder zones towards the beads, without inducing sudden variations of rigidity in the carcass structure and consequent localized stresses with potential breakage triggering.

Preferably, the deposition surface is substantially smooth and continuous. Preferably, before forming said at least one carcass ply, at least one layer-form elastomeric liner is obtained, by deposition of a continuous elongated element wound according to consecutively adjacent coils on the deposition surface.

Preferably, the deposition surface has an intermediate portion axially interposed between two terminal portions having diameter greater than an application diameter presented by the intermediate portion.

The deposition of the strip-like elements on surface portions with differentiated diameter simplifies the obtainment of overlap zones with differentiated width in accordance with the design needs.

Preferably, the intermediate section of each overlap zone is arranged on the intermediate portion of the deposition surface.

Preferably, the terminal sections of each overlap zone are arranged on the respective terminal portions of the deposition surface.

Preferably, the ratio between the circumferential extension of the terminal portions of the deposition surface and the difference between the circumferential extension of the terminal portions of the deposition surface and the circumferential extension of the intermediate portion is comprised between 90 and 110.

It is thus advantageously possible to obtain an optimal reduction of the width of the overlap zone in the terminal portions, without causing separations between circumferentially adjacent strip-like elements.

Preferably, said deposition surface is defined by a building drum having two half-parts axially positionable with respect to a central section interposed between them.

Preferably, the intermediate section of each overlap zone is arranged on the central section of the building drum.

Preferably, the terminal sections of each overlap zone are arranged on the respective axially positionable half-parts of the building drum.

Preferably, in said deposition surface the difference between a maximum diameter of the terminal portions and an application diameter presented by the intermediate portion is comprised between about 1 and about 10 mm.

Preferably, in each overlap zone, the difference between a maximum width detectable in the intermediate section and a minimum width detectable along the terminal sections is less than about 0.5 mm.

Preferably, before the formation of said at least one carcass ply, auxiliary support members, each having at least one circumferential support surface extending on the continuation of the deposition surface, are engaged with the building drum, each in axially approached relation with regard to one of said half-parts.

Preferably, said at least one carcass ply applied around the deposition surface has axially opposed end flaps each lying on the circumferential support surface of the respective auxiliary support member.

Preferably, it is provided to form an external annular sleeve, comprising a belt structure.

Preferably, it is provided to shape the carcass sleeve according to a substantially toroidal configuration, in order to couple it to a radially inner surface of the external annular sleeve.

Preferably, before shaping the carcass sleeve said auxiliary support members are disengaged from the building drum.

Preferably, shaping the carcass sleeve is executed by engaging, with the building drum, a pair of auxiliary shaping members, each in axially approached relation with regard to one of said half-parts.

Preferably, shaping the carcass sleeve comprises feeding an operating fluid into the carcass sleeve, during a mutual approaching of the annular anchoring structures.

Preferably, shaping the carcass sleeve comprises feeding an operating fluid into the carcass sleeve, before actuating a mutual approaching of the annular anchoring structures.

Preferably, each auxiliary shaping member is engaged with the building drum in replacement of each auxiliary support member, upon removal of the same from the building drum.

It is thus possible to provide a building drum with limited weight and size, that can be easily handled during the building process in different work stations, and be adapted for the engagement of the annular anchoring structures and for the execution of the shaping without having to remove the carcass structure formed thereon until the end of the building process. Preferably, said at least one carcass ply is locked with respect to annular anchoring structures upon action of the auxiliary shaping members.

In such a manner, undesired and uncontrolled movements of the annular anchoring structures and/or structural distortions of the carcass structure at the beads following shaping are thus avoided.

Preferably, each auxiliary support member is engaged with the building drum at at least one connection member carried by the building drum itself.

Preferably, after the disengagement of the auxiliary support members and before the engagement of said auxiliary shaping members at least one annular anchoring structure is engaged with each end flap of said at least one carcass ply.

The execution of such action after the disengagement of the auxiliary support members facilitates the engagement of the annular anchoring structures, even if with diameter smaller than the diameter of the deposition surface.

Preferably, before the engagement of said annular anchoring structures, axially opposed end flaps of said at least one carcass ply are bent towards a geometric axis of the deposition surface.

Preferably, said annular anchoring structures define a fitting diameter smaller than an application diameter defined by the deposition surface. Preferably, said application diameter is greater than or equal to about 102% of the fitting diameter.

Preferably, said application diameter is less than or equal to about 120% of the fitting diameter.

Advantageously, in such a manner the containment of the deformation imposed on the carcass structure becomes particularly effective. The limited stresses imposed on the carcass ply/plies indeed allow minimizing the transverse width of the overlap zones of the strip-like elements, without the dilatation of the carcass ply/plies during shaping causing undesired separations between one strip-like element and the next.

Preferably, each of the strip-like elements laid on the deposition surface has a longitudinal axis thereof parallel with respect to a rotation axis of the building drum.

Preferably, each of the strip-like elements laid on the deposition surface forms a non-zero angle between a longitudinal axis thereof and a radial plane of the building drum.

Preferably, forming said carcass sleeve comprises:
forming a first carcass ply; and
forming a second carcass ply radially superimposed on the first carcass ply,
wherein the strip-like elements laid for respectively forming said first and second carcass ply respectively have crossed longitudinal extensions. Preferably, the intermediate sections of the overlap zones have an axial size substantially equal to the axial size of the belt structure.

Preferably, the terminal portions of the deposition surface have respective frustoconical zones tapered towards respective axially inner edges directed towards said intermediate portion.

Preferably, the deposition surface is substantially smooth and continuous. Preferably, coiling devices are configured for laying a continuous elongated element wound according to consecutively adjacent coils on the deposition surface.

Preferably, each frustoconical zone has an axial size comprised between about 10 and about 100 mm.

Preferably, each frustoconical zone has an axial size comprised between 2 and 50 times the difference between a maximum diameter and a minimum diameter of the frustoconical zone itself.

Preferably, the ratio between the circumferential extension of the terminal portions of the deposition surface and the difference between the circumferential extension of the terminal portions of the deposition surface and the circumferential extension of the intermediate portion is comprised between 90 and 110.

Preferably, in said deposition surface the difference between a maximum diameter of the terminal portions and an application diameter presented by the intermediate portion is comprised between about 1 and about 10 mm. Preferably, at least one pair of auxiliary support members are removably engageable with the building drum, in axially approached relation each with a respective half-part of the building drum, and having respective circumferential support surfaces extending on the continuation of said deposition surface in order to support axially opposed end flaps of said at least one carcass ply.

Preferably, said circumferential support surfaces have substantially cylindrical shaping with diameter equal to the diameter of the axially outer terminal portions of the deposition surface.

Preferably, second forming devices are configured for forming an external annular sleeve, comprising a belt structure.

Preferably, assembling devices are configured for shaping the carcass sleeve according to a substantially toroidal configuration and for coupling it to a radially inner surface of the external annular sleeve.

Preferably, a pair of auxiliary shaping members are removably engageable with the building drum, each in axially approached relation with regard to one of said half-parts.

Preferably, each auxiliary shaping member is removably engageable with the building drum in replacement of said auxiliary support members.

Preferably, said auxiliary shaping members are configured for locking said at least one carcass ply with respect to the annular anchoring structures. Preferably, each of said auxiliary support members is operatively engageable with a connection member carried by the building drum.

Preferably, each auxiliary shaping member is removably engageable with the respective connection member in replacement of one of said auxiliary support members.

The Applicant deems it advantageous to arrange a building drum comprising suitable connection members adapted to be operatively associable both with auxiliary support members necessary for the various steps for building the different components, and with the aforesaid auxiliary shaping members necessary at the end of building for allowing the drum itself to attain the shaping of the tyre being processed.

Preferably, the connection members are integrally carried, each by one of the half-parts of the building drum.

The aforesaid connection members thus standardise the mechanical association of the building drum with devices that are external and separated therefrom and which are necessary for obtaining the built green tyre, according to the above-illustrated characteristics of productivity and flexibility, also decreasing the manufacturing complexity of the building drum itself.

Preferably, each overlap zone has width progressively decreasing away from the intermediate section.

Preferably, in each overlap zone, the difference between a maximum width detectable in the intermediate section and a minimum width detectable along the terminal sections is less than about 0.5 mm.

Preferably, a belt structure is associated at a circumferentially outside position to the carcass structure.

Preferably, each of said strip-like elements has a longitudinal axis thereof parallel with respect to a geometric rotation axis of the tyre.

Preferably, each of said strip-like elements forms a non-zero angle between a longitudinal axis thereof and a radial plane of the tyre.

Preferably, strip-like elements respectively belonging to a first and to a second carcass ply respectively have crossed longitudinal extensions.

Preferably, the intermediate sections of the overlap zones have an axial size substantially equal to the axial size of the belt structure.

Further characteristics and advantages will be clearer from the detailed description of a preferred but not exclusive embodiment of a process and an apparatus for manufacturing tyres, in accordance with the present invention.

BRIEF DESCRIPTION OF THE DRAWINGS

Such description will be set forth hereinbelow with reference to the set of drawings, provided only as a non-limiting example, in which:

FIG. 4 schematically shows, in diameter section, a carcass sleeve in a step for auxiliary shaping members to engage the beads;

FIG. 5 shows a tyre being processed in the step in which the carcass sleeve is shaped for the application of an external sleeve thereto;

FIG. 6 is a scheme that shows several strip-like elements deposited on the building drum during the manufacturing of a carcass sleeve in accordance with the present invention.

DETAILED DESCRIPTION

Figure 1:
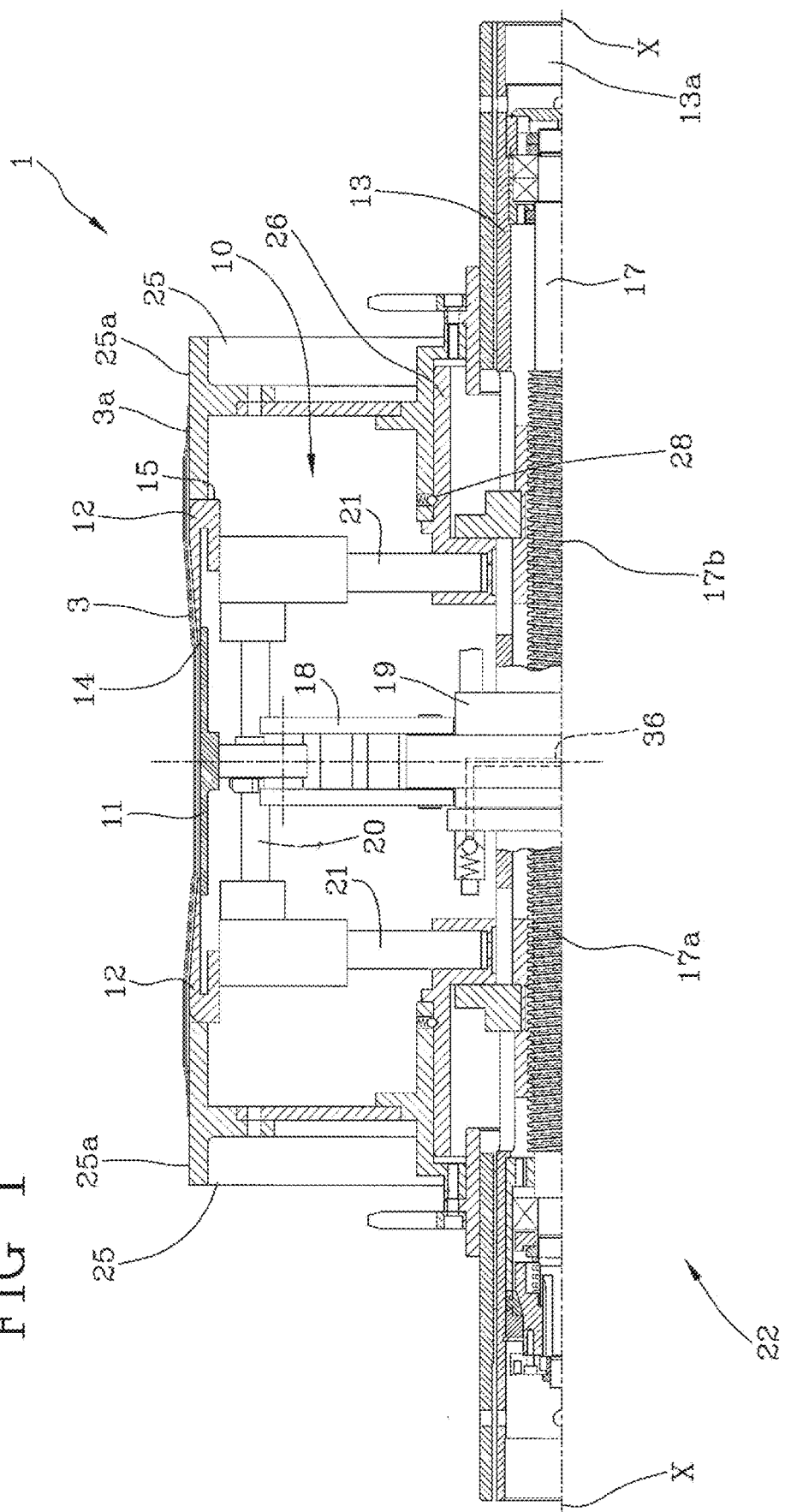
FIG. 1 schematically shows, in diameter section, a step for applying a carcass ply around a building drum.

With reference to the abovementioned figures, reference number 1 indicates overall an apparatus for building tyres for vehicle wheels, arranged to actuate a process according to the present invention.

The apparatus 1 is set to manufacture tyres 2 (FIG. 5) essentially comprising at least one carcass ply 3 preferably internally covered by a layer of impermeable elastomeric material or so-called liner 4. Two annular anchoring structures 5, each comprising a so-called bead core 5a preferably carrying an elastomeric filler 5b in radially outer position, are engaged with respective end flaps 3a of the carcass ply/plies 3. The annular anchoring structures 5 are integrated in proximity to zones normally identified with the name of "beads" 6, at which the engagement normally occurs between the tyre 2 with a respective mounting rim (not depicted), according to a fitting diameter D0 determined by the internal diameter sizes of the annular anchoring structures 5.

A belt structure 7 is circumferentially applied around the carcass ply/plies 3, and a tread band 8 is circumferentially superimposed on the belt structure 7. Two sidewalls 9, each extending from the corresponding bead 6 to a corresponding lateral edge of the tread band 8, are applied in laterally opposite positions on the carcass ply/plies 3.

The apparatus 1 comprises a building drum 10 having a central section 11 axially interposed between two half-parts 12 and extending substantially in a relation of surface continuity with respect to the same so as to define, together with such half-parts in radially outer position, a substantially smooth and continuous deposition surface 10a.

The half-parts 12 and the central section 11 are supported by a central shaft 13 extending along a geometric axis X-X of the building drum 10 and of the deposition surface 10a. Such geometric axis X-X also corresponds with a geometric rotation axis of the finished tyre 2.

Identifiable in the deposition surface 10a are an intermediate portion 11a, defined by the central section 11 and two terminal portions 12a that are axially outer with respect to the central section 11, defined by the half-parts 12.

The half-parts 12 are slidably engaged around the central section 11. In other words, the central section 11 is axially fit in radially inner position with respect to the half-parts 12.

Consequently, the terminal portions 12a of the deposition surface 10a have a maximum diameter Dmax greater than an application diameter D1 presented by the intermediate portion 11a. Preferably, the ratio between the circumferential extension of the terminal portions 12a of the deposition surface 10a and the difference between the circumferential extension of said terminal portions and the circumferential extension of the intermediate portion 11a is comprised between 90 and 110.

The terminal portions 12a of the deposition surface 10a, each delimited between an axially inner edge 14 and an axially outer edge 15 of the respective half-part 12, have respective frustoconical zones 16 that are tapered starting from the maximum diameter Dmax up to a minimum diameter, towards the respective axially inner edges 14 directed towards the intermediate portion 11a. In the illustrated embodiment, the minimum diameter detectable on the axially inner edges 14 substantially corresponds to the application diameter D1 detectable on the intermediate portion 11a.

The difference between the maximum diameter Dmax of the terminal portions 12a and the application diameter D1 detectable on the intermediate portion 11a can for example be comprised between 1 and 10 mm.

The frustoconical zones 16 can extend according to the entire axial size of the respective terminal portions 12a, or, as represented in the enclosed drawings, they can terminate at a desired distance from the respective axially outer edges 15.

More particularly, it can be provided that each frustoconical zone 16 has an axial size comprised for example between 10 and 100 mm.

It can also be provided that the axial size of each frustoconical zone 16 is comprised between 2 and 50 times the difference between a maximum diameter Dmax and the minimum diameter of the frustoconical zone 16 itself.

The half-parts 12 are axially positionable with respect to the central section 11 and/or axially movable with respect to each other. For example, a threaded bar 17 can be operatively arranged within the central shaft 13 and carrying two threaded portions 17a, 17b respectively clockwise and anti-clockwise, each engaging one of the half-parts 12. The half-parts 12 of the building drum 10 are consequently induced to translate simultaneously in respectively opposite directions along the central shaft 13, following rotations imparted to the threaded bar 17 by means of an actuator (not illustrated) operatively couplable to one end of the central shaft 13.

Each of the half-parts 12 and the central section 11 axially interposed between them are preferably composed of respective circumferential sectors, radially movable between a rest condition and a work condition. In the rest condition (not illustrated), said circumferential sectors are radially approached to the geometric axis X-X in order to confer the building drum 10 a diameter size smaller than the fitting diameter D0 of the tyre being processed, in order to allow the removal of the tyre 2 from the building drum itself. In the work condition, the circumferential sectors preferably extend in a relation of circumferential continuity, so as to form the aforesaid deposition surface 10a, defining an application diameter D1 preferably greater than the fitting diameter D0, as in the enclosed figures. More particularly, the application diameter D1 can for example be greater than or equal to about 102% of the fitting diameter D0. In a preferred embodiment, the application diameter D1 can for example be smaller than or equal to about 120% of the fitting diameter D0.

In the illustrated embodiment, the radial movement of the circumferential sectors is actuated through a plurality of connecting rods 18, each constrained between one of the sectors of the central section 11 and a command collar 19, rotatably carried by the central shaft 13 and drivable in angular rotation by means of an external actuator (not illustrated). By means of transmission bars 20 axially extending through the sectors of the central section 11, the radial movements of the latter are transmitted to the circumferential sectors of the axially opposite half-parts 12 of the building drum 10, slidably guided along respective columns 21 radially extending with respect to the central shaft 13.

The building drum 10 is adapted to be transferred, by means of at least one robotic arm (not depicted) or transfer devices of another type operating on at least one grip end 13a presented by the central shaft 13, to one or more work stations 22, 23 in order to allow the execution of various processing steps aimed for the assembly of the tyre 2 being processed.

Figure 2:
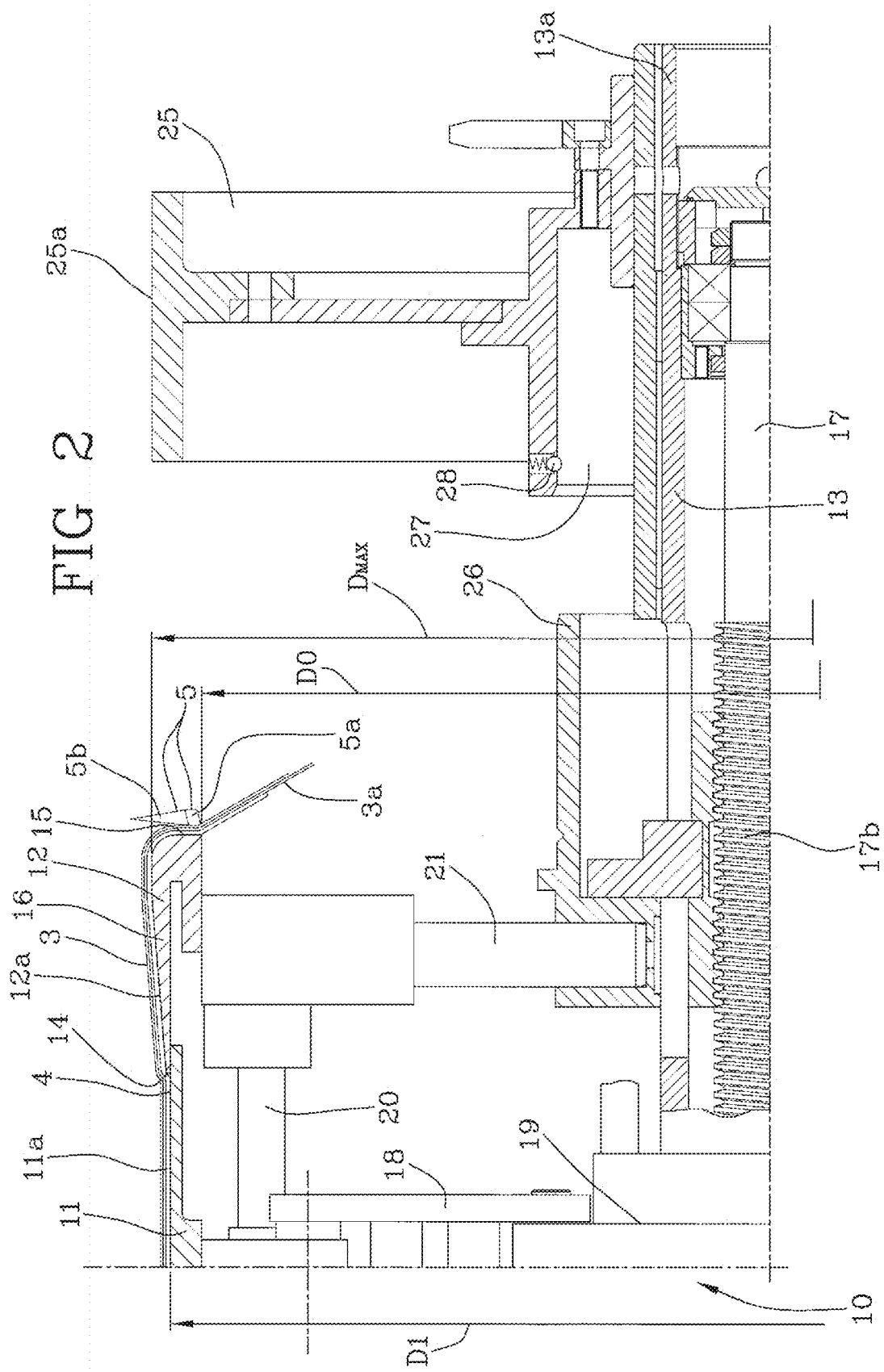
FIG. 2 shows, in enlarged scale with respect to FIG. 1, a step in which annular anchoring structures are coaxially fit on the respective end flaps of the carcass ply/plies.
Figure 3:
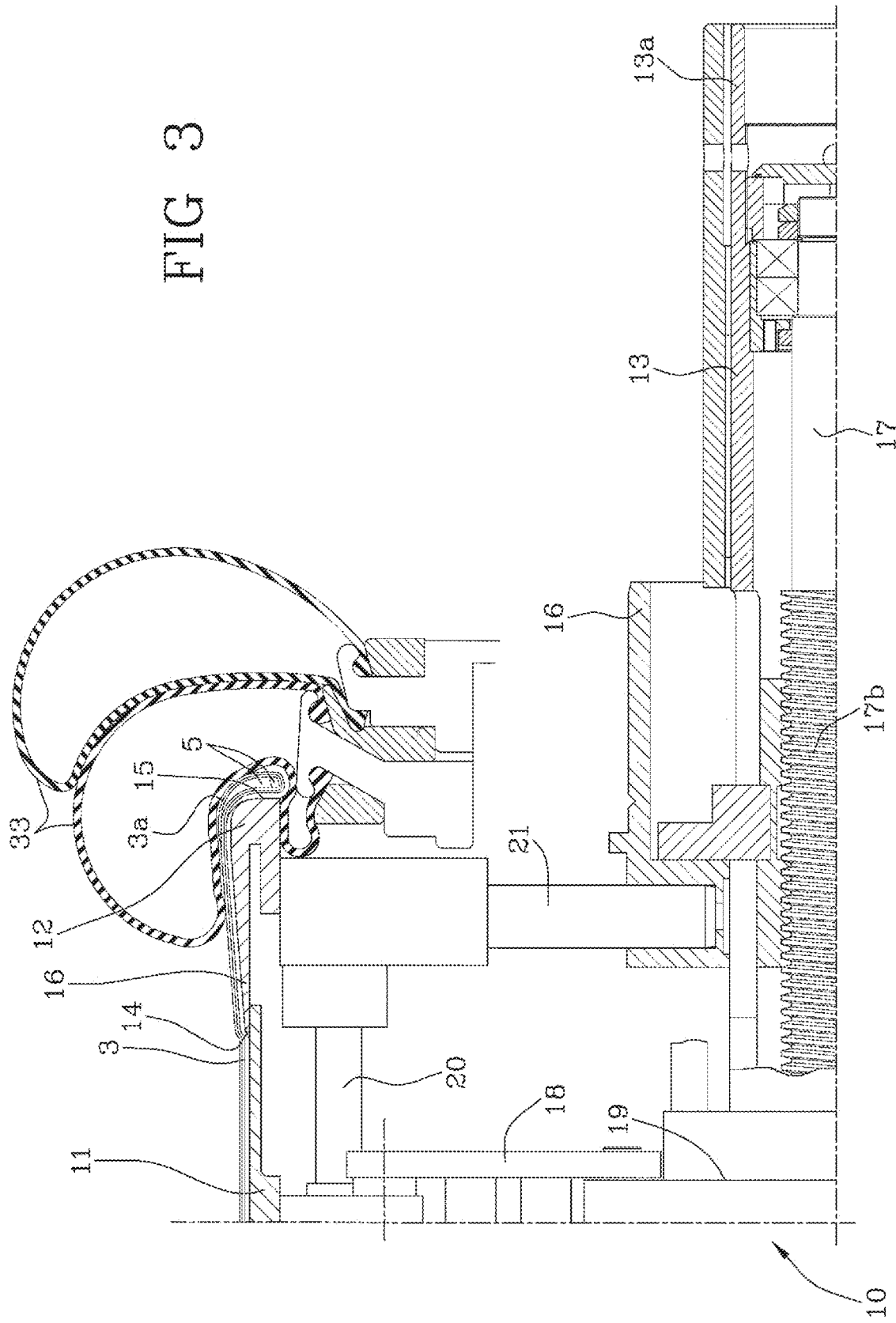
FIG. 3 shows, in enlarged scale with respect to FIG. 1, a step for turning up the end flaps of the carcass ply/plies around the respective annular anchoring structures.

More particularly, the building drum 10 is first engaged in a building station 22 (FIGS. 1 to 3) equipped with first forming devices (not represented) configured for obtaining a so-called substantially cylindrical carcass sleeve 24, comprising the carcass ply/plies 3 coupled to the respective annular anchoring structures 5.

At least one external handling device (not depicted since it can be obtained in a known manner), positions auxiliary support members 25 on axially opposite sides of the building drum 10, each in axially approached relation with regard to one of the half-parts 12.

The auxiliary support members 25, obtained for example in the form of two annular elements, externally have respective circumferential support surfaces 25a, having preferably substantially cylindrical shape with diameter substantially equal to the diameter of the terminal portions 12a. More particularly, the diameter of the circumferential support surfaces 25a preferably coincides with the maximum diameter Dmax detectable on the half-parts 12, at the axially outer edges 15. Upon completed approaching, the circumferential support surfaces 25a extend in a relation of continuity on the continuation of the deposition surface 10a.

The engagement of the auxiliary support members 25 with the building drum 10 occurs at respective connection members 26 carried by the building drum itself. Preferably each connection member 26, made for example in cylindrical sleeve form, is integrally carried by one of the half-parts 12 of the building drum 10 and operatively couplable with an engagement seat 27 carried by the respective auxiliary support member 25.

One or more connection elements 28, obtained for example in the form of bead-like elements elastically thrust towards the geometric axis X-X, are adapted to be automatically engaged in respective slots arranged in the connection members 26, so as to retain each auxiliary support member 25 in an engagement relation with regard to the building drum 10, even after the disengagement of the members themselves by the aforesaid external handling device. The building drum 10 is thus adapted to be transferred, if required, between at least one first and one second work unit (not depicted) provided in the building station 22, together with the auxiliary support members 25 constrained thereto.

In the building station 22, coiling devices (not depicted) can operate, having for example one or more dispensing members that feed at least one continuous elongated element made of elastomeric material while the building drum 10 is driven to rotate around its geometric axis X-X, so as to form the layer-form elastomeric liner 4 on the deposition surface 10a and on the circumferential support surfaces 25a. In addition or as an alternative to the liner 4, the coiling devices and/or other auxiliary devices can be arranged to form, on the circumferential support surfaces 25a, anti-abrasive inserts to be incorporated at the beads 6 and/or, in the case of run-flat tyres, auxiliary support inserts made of elastomeric material (so-called sidewall-inserts) applied on the respective half-parts 12 of the building drum 10, so as to then be incorporated within the tyre 2 in the zone of the sidewalls 9.

The concavity determined by the difference between the application diameter D1 and the maximum diameter Dmax respectively detectable on the intermediate portion 11a and on the half-parts 12 of the building drum is also adapted to geometrically accommodate a possible semifinished product made of self-sealing material and/or possible additional layers, applicable at the intermediate portion 11a before or after the deposition of the liner 4.

Following the formation of the liner 4, of the abovementioned possible inserts and/or possible other components, the first forming devices apply the carcass ply/plies 3 around the deposition surface 10a. In a preferred embodiment solution, the carcass ply/plies 3 as well as possibly other parts of the tyre 2 are obtained by deposition of elementary semifinished products. Such elementary semifinished products are adapted to be used in a quantity appropriate for composing one or more of the above-described constituent elements of the tyre, without requiring the storage of semifinished products.

For such purpose, the first forming devices comprise application devices configured for sequentially applying a plurality of strip-like elements 29 extending transversely with respect to the circumferential extension of the deposition surface 10a, while the building drum 10 is actuated to rotate according to a step-by-step progression, analogous that described for example in the document U.S. Pat. No. 6,328,084 on behalf of the same Applicant.

The carcass ply/plies 3 are thus preferably formed directly on the building drum 10, and/or on the possible components previously arranged thereon. For such purpose, a predetermined number of strip-like elements 29 are laid consecutively adjacent one after the other around the circumferential extension of the deposition surface 10a, to cover the entire circumferential extension thereof.

Each of the strip-like elements 29 laid on the deposition surface 10a can have its longitudinal extension axis parallel to the geometric axis X-X. In a different embodiment, each of the strip-like elements 29 deposited on the deposition surface 10a can form a non-zero angle between a longitudinal extension thereof and a radial plane passing through the geometric axis X-X.

More particularly, the obtainment of the carcass sleeve 24 can provide for the formation of only one carcass ply 3, or two or more carcass plies, in which case the strip-like elements 29 laid for respectively forming a first and a second carcass ply 3 preferably respectively have crossed longitudinal extensions.

During the deposition, circumferentially consecutive strip-like elements 29 are laid one after the other, in such a manner ensuring that a first longitudinal edge 29a of the subsequent strip-like element 29 is superimposed on a corresponding second longitudinal edge 29b of the previously laid strip-like element 29. Mutual overlap zones 30 are thus formed along respective longitudinal edges 29a, 29b of the respectively consecutive strip-like elements 29.

Given that the central section 11 of the building drum is slidably fit within respective half-parts 12, the deposition surface 10a assumes a profile in cross section that is substantially concave. Consequently, also due to the difference between the application diameter D1 and the maximum diameter Dmax respectively detectable on the central section 11 and on the half-parts 12 of the building drum, the width of the overlap zone 30 created between each pair of circumferentially adjacent strip-like elements 29, measurable for example according to a circumferential direction, varies along the longitudinal extension of the strip-like elements 29 in accordance with the size variations, in terms of diameter and circumferential extension, present along the deposition surface 10a, respectively at the central section 11 and at the half-parts 12.

More particularly, along the longitudinal extension of each overlap zone 30, an intermediate section 31 can be identified, arranged at the central section 11 and/or at the intermediate portion 11a of the deposition surface 10a, and two terminal sections 32 can be identified that are laterally opposite with respect to the intermediate section 31, at least partially arranged at the respective half-parts 12 and/or at the terminal portions 12a of the deposition surface 10a. This circumstance is better seen in the scheme of FIG. 6, where the overlap zones 30 are shown with hatching, with the differences of width intentionally amplified.

The intermediate section 31 of each overlap zone 30 has greater width than the width of the terminal sections 32. Preferably, the difference between a maximum width Wmax detectable in the intermediate section 31 and a minimum width Wmin detectable along the terminal sections 32 is less than about 0.5 mm. The aforesaid widths are for example detectable according to a circumferential direction.

Preferably, at least in the presence of the tapered frustoconical zones 16, the overlap zone 30 has width progressively decreasing in moving away from the intermediate section 31, until it reaches the minimum size Wmin. The minimum width Wmin of superimposition may assume a zero value, for example at the axially outer edges 15 of the half-parts 12 or at a desired axial distance from the same. Therefore, the mutual overlap zones 30 can extend according to the entire longitudinal extension of the strip-like elements 29 or limited to one part thereof.

Preferably, the deposition surface 10a has an axial size smaller than the width of said at least one carcass ply 3, so that the end flaps 3a of the carcass ply/plies 3 arranged on the building drum 10 axially project from the opposite ends of the deposition surface 10a and result at least partially supported by the abovementioned circumferential support surfaces 25a. At the end flaps 3a, the overlap zone 30 between adjacent strip-like elements 29 preferably maintains the aforesaid minimum width Wmin.

Once the formation of the carcass ply/plies 3 has been completed, the auxiliary support members 25 are disengaged from the respective connection members 26. Such disengagement can be obtained, for example, with the aid of the aforesaid external handling device, by means of a simple action of axial moving away from the respective half-parts 12 of the building drum 10, so as to remove the circumferential support surfaces 25a from the anti-abrasive inserts, and/or from the liner 4, and/or from the carcass ply/plies 3.

The removal of the support surfaces 25a makes it possible, upon possible transfer of the building drum 10 to a further processing unit, to fold—towards the geometric axis X-X of the building drum 10—the end flaps 3a of the carcass ply/plies 3 applied around the building drum 10; for example, this occurs with the aid of rollers or other members not illustrated since they can be obtained in any convenient manner.

Positioning members, not illustrated since obtainable in per se known manner, provide to fit each of the annular anchoring structures 5 coaxially around one of the end flaps 3a of the carcass ply/plies 3 folded towards the geometric axis X-X, by positioning it in a relation of axial abutment against the corresponding half-part 12 of the building drum 10.

Upon completed positioning, small inflatable chambers 33 or other turning-up members (FIG. 3) provide to turn up each of the end flaps 3a around the respective annular anchoring structure 5, so as to stabilise the engagement of the same with the carcass ply/plies 3, causing the formation of the aforesaid carcass sleeve 24.

Once the engagement of the annular anchoring structures 5 has been completed, or at the same time as this operating step, the application of the sidewalls 9 can be actuated.

The building drum 10 carrying the carcass sleeve 24 is then preferably transferred to the assembly station 23 (FIGS. 4 and 5), which is remote with respect to the building station 22, in order to receive in engagement an external sleeve 34 integrating the belt structure 7, preferably already coupled with the tread band 8.

The external sleeve 34, having an internal diameter D2 greater than the application diameter D1, can be previously prepared by means of second forming devices, not represented since they can be obtained in a per se known manner, configured for determining the formation and/or winding of one or more belt layers adapted to obtain the belt structure 7 on an auxiliary drum (not represented), and the subsequent application of the tread band 8 on the belt structure 7 carried by the auxiliary drum.

According to an alternative embodiment, at least one portion of the sidewalls 9 can be built on the external sleeve 34.

The external sleeve 34 thus formed is adapted to be removed from the auxiliary drum, for example by means of a transfer ring 35 or other suitable devices that then provide to arrange it in coaxially centered position around the carcass sleeve 24 carried by the building drum 10.

Assembling devices then act on the building drum 10 in order to shape the carcass sleeve 24 according to a toroidal configuration (FIG. 5), so as to determine the coupling thereof to a radially inner surface of the external sleeve 34.

The assembling devices can for example comprise the aforesaid actuator (not depicted) arranged to drive in rotation the threaded bar 17, in order to cause a mutual axial approaching of the half-parts 12 of the building drum 10 and, consequently, of the annular anchoring structures 5 of the carcass sleeve 24. Preferably, the assembling devices also comprise inflation members having a pneumatic circuit connected to at least one feed channel 36, obtained for example along the central shaft 13, in order to feed an operating fluid into the carcass sleeve 24 and cause the radial expansion thereof by means of inflation, during the mutual approaching of the annular anchoring structures 5.

The building drum 10 is then operatively engaged with at least one pair of auxiliary shaping members 37, each in axially approached relation with regard to one of said half-parts 12. The auxiliary shaping members 37 represent components of the apparatus 1 separate from the building drum 10, and are adapted to be integrated with the assembling devices in order to allow the execution of the step for shaping the carcass sleeve 24. More particularly, the auxiliary shaping members 37 are each adapted to act against a circumferential abutment edge carried by the building drum 10 itself, in order to allow the toroidal shaping of the carcass ply/plies 3 at the same time as the mutual approaching movement of the half-parts 12.

More particularly, each auxiliary shaping member 37 is adapted to act in a thrust relation against one of the annular anchoring structures 5, each defining one of the aforesaid circumferential abutment edges, in order to maintain the beads 6 against the building drum 10 and/or lock the carcass ply/plies 3 with respect to the annular anchoring structures 5 during the shaping step, so as to prevent undesired sliding of the carcass ply/plies themselves or any other undesired deformation in the zones of the beads 6 during the radial expansion of the carcass sleeve 24.

Each auxiliary shaping member 37 preferably comprises at least one flange element 38 removably fixable in axially approached relation with regard to the respective half-part 12 of the building drum 10, and carrying at least one sealing ring 39 arranged to act against the respective annular anchoring structure 5 carried by the building drum 10. Each sealing ring 39, preferably having a continuous circumferential extension, is also adapted to carry out a function of hermetic sealing closure of the carcass sleeve 24 at the annular anchoring structures 5, facilitating the radial expansion of the sleeve itself and the maintenance of the inflation state following the shaping step.

Each auxiliary shaping member 37 can be advantageously associated with a plurality of sealing rings 39 that are respectively concentric and have respectively different diameters. In such a manner, it is advantageously possible to use the same auxiliary shaping members 37 for the processing of a vast array of tyres having different fitting diameters.

The auxiliary shaping members 37 can be removably coupled on the respective connection members 26 of the building drum 10, each in replacement of the respective auxiliary support member 25, by means of respective brakes 40, preferably of hydraulic or pneumatic type, each configured for operating on the respective connection member 26 in order to determine a stable axial anchoring of the auxiliary shaping members 37 with respect to the building drum 10.

The combined action of mutual approaching of the half-parts 12 and simultaneous introduction of air or another fluid into the carcass sleeve 24 brings the latter to progressively expand in radial direction, until it abuts against the radially inner surface of the belt structure 7 positioned around the building drum.

The radial expansion of the carcass sleeve 24 for the purposes of the shaping can be preceded by an action of separation of the radially internal surfaces of the carcass sleeve itself from the deposition surface 10a, due to the operating fluid introduced in the sleeve itself. The subsequent radial expansion for the purposes of the shaping can thus be carried out in a uniform and continuous manner, without the half-parts 12 in mutual approaching being able to mechanically interfere with the radially inner surfaces of the carcass sleeve 24. The substantially concave profile in cross section of the deposition surface 10a facilitates the execution of this operation. Indeed, due to the concavity of the profile, the carcass ply/plies 3, the liner 4 and/or other structural components associated therewith can carry out a slight radial movement required for the separation, without having to oppose significant mechanical strength and/or be subjected to irregular stresses. A possible anticipation of the introduction of the operating fluid into the carcass sleeve 24 with respect to the start of the mutual approaching of the half-parts can therefore be limited to values not greater than about 1-2 seconds, or it can even be avoided.

The axial extension of the intermediate sections 31 substantially corresponds with the axial size of the belt structure 7. Consequently, upon completed shaping, as in the finished tyre, the intermediate sections 31 of the overlap zones 30 are substantially extended up to the axially opposite edges of the belt structure 7. The terminal sections 32 of the overlap zones 30 are extended at the sidewalls 9 of the built tyre, starting from the respective axially opposite edges of the belt structure 7 up to in proximity to the annular anchoring structures 5 integrated in the beads 6.

During shaping, the greater width of the overlap zones 30 at the intermediate sections 31 ensures the maintenance of the structural integrity of the carcass ply/plies 3, preventing undesired separations between adjacent strip-like elements 29 due to the action of circumferential dilatation imposed following the radial expansion.

The smaller width of the overlap zones 30 in the terminal sections 32 is in any case sufficient to ensure the structural integrity of the carcass ply/plies 3. Indeed, upon completed shaping, the terminal sections 32 of the overlap zones 30 are positioned in the zones extending from the axially outer edges of the belt structure 7 towards the beads 6, where the dilatation imposed due to the shaping is progressively decreasing to a substantially zero value at the reinforcement annular structures 5.

The smaller width of the overlap zones 30 in the respective terminal sections 32 moreover confers a greater structural uniformity to the carcass sleeve 24, in the zones subjected to greater deformation during travel, reducing or eliminating discontinuities of rigidity that can be detrimental to ride comfort and/or the resistance to the fatigue stresses imposed during the use of the tyre.

Once the shaping step is completed, the brakes 40 can be deactivated in order to allow the axial removal of the auxiliary shaping members 37 from the building drum 10. The building drum 10 can then be possibly transferred to at least one additional processing station (not depicted).

Upon completed building, the tyre 2 can be removed from the building drum 10 upon disengagement of the auxiliary shaping members 37 and radial contraction of the drum itself, in order to be subjected to a moulding and vulcanising cycle that can be executed in any convenient manner.

The invention claimed is:

1. An apparatus for building tyres for vehicle wheels, comprising:
   a building drum comprising a central section axially interposed between two half-parts to define a substantially cylindrical deposition surface, the two half-parts being distinct from and engageable with the central section; and
   first forming devices configured for forming a carcass sleeve on the building drum,
   wherein said first forming devices comprise laying devices configured for laying circumferentially consecutive strip-like elements around a circumferential extension of the deposition surface of the building drum,
   wherein said deposition surface of the building drum comprises:
   two axially external terminal portions defined by the two half-parts; and
   an intermediate portion defined by the central section, extending across an axial symmetry plane of the deposition surface and axially interposed between the two terminal portions, the central section being in a radially inner position with respect to the two terminal portions, the two half-parts having respective frustoconical zones that are tapered from respective axially outer edges defining a maximum diameter of the deposition surface, towards respective axially inner edges of the half-parts overlapping with the central section, wherein the intermediate portion defines an application diameter of the deposition surface at said axial symmetry plane, the two terminal portions defining along their entire extension a diameter of the deposition surface that is greater than the application diameter.

2. The apparatus according to claim 1, wherein the deposition surface is substantially smooth and continuous.

3. The apparatus according to claim 1, further comprising coiling devices configured for laying a continuous elongated element wound according to consecutively adjacent coils on the deposition surface.

4. The apparatus according to claim 1, wherein each frustoconical zone has an axial size comprised between about 10 and about 100 mm.

5. The apparatus according to claim 1, wherein each frustoconical zone has an axial size comprised between 2 and 50 times the difference between the maximum diameter and a minimum diameter of the frustoconical zone itself.

6. The apparatus according to claim 1, wherein the ratio between the circumferential extension of the terminal portions of the deposition surface and the difference between the circumferential extension of the terminal portions of the deposition surface and the circumferential extension of the intermediate portion is comprised between 90 and 110.

7. The apparatus according to claim 1, wherein in said deposition surface, the difference between the maximum diameter of the terminal portions and the application diameter presented by the intermediate portion is comprised between about 1 and about 10 mm.

8. The apparatus according to claim 1, further comprising at least one pair of auxiliary support members removably engageable with the building drum, each in an axially approached relation with regard to a respective half-part of the building drum, and having respective circumferential support surfaces extending on the continuation of said deposition surface in order to support axially opposed end flaps of a carcass ply of said carcass sleeve.

9. The apparatus according to claim 8, wherein said circumferential support surfaces have substantially cylindrical shape with diameter equal to the maximum diameter of the deposition surface.

10. The apparatus according to claim 1, further comprising second forming devices, wherein the second forming devices are configured for forming an external annular sleeve, comprising a belt structure.

11. The apparatus according to claim 10, further comprising assembling devices, wherein the assembling devices are configured for shaping the carcass sleeve according to a substantially toroidal configuration and coupling it to a radially inner surface of the external annular sleeve.

12. The apparatus according to claim 1, further comprising a pair of auxiliary shaping members removably engageable with the building drum, each in an axially approached relation to one of said half-parts.

13. The apparatus according to claim 8, further comprising a pair of auxiliary shaping members removably engageable with the building drum, each in an axially approached relation to one of said half-parts, wherein each auxiliary shaping member is removably engageable with the building drum in replacement of said auxiliary support members.

14. The apparatus according to claim 13, wherein said auxiliary shaping members are configured for locking said carcass ply with respect to annular anchoring structures.

15. The apparatus according to claim 8, wherein each of said auxiliary support members is operatively engageable with a connection member carried by the building drum.

16. The apparatus according to claim 15, further comprising a pair of auxiliary shaping members removably engageable with the building drum, each in an axially approached relation to one of said half-parts, wherein each auxiliary shaping member is removably engageable with the respective connection member in replacement of one of said auxiliary support members.

17. The apparatus according to claim 15, wherein the connection members are integrally carried, each by one of the half-parts of the building drum.

18. The apparatus according to claim 1, wherein the two half-parts are slidably engaged around the central section and configured to axially approach the central section, thus increasing an extent of an overlapping region between a respective half-part and the central section.

19. The apparatus of claim 1, wherein the axially inner edges of the two half-parts define a minimum diameter of each terminal portion, each axially inner edge being radially external to the central section on an overlapping region between a respective half-part of the two half-parts and the central section.

20. The apparatus of claim 1, wherein a distance between the axially inner edge of one half-part and the axially inner edge of the other half-part defines, on the central section, an axial extension of a non-overlapping region between the two half-parts and the central section.

* * * * *